United States Patent
Epps

(10) Patent No.: US 8,500,373 B1
(45) Date of Patent: Aug. 6, 2013

(54) PNEUMATIC DELIVERY SYSTEM WITH BRAKING

(75) Inventor: Ray Epps, Houston, TX (US)

(73) Assignee: Quick Tube Systems, Inc., Tomball, TX (US)

( * ) Notice: Subject to any disclaimer, the term of this patent is extended or adjusted under 35 U.S.C. 154(b) by 466 days.

(21) Appl. No.: 12/501,568

(22) Filed: Jul. 13, 2009

(51) Int. Cl.
 *B65G 51/36* (2006.01)
 *B65G 51/02* (2006.01)
(52) U.S. Cl.
 CPC .................................. *B65G 51/02* (2013.01)
 USPC ............................................. 406/28; 406/13
(58) Field of Classification Search
 USPC ...................... 406/83, 84, 109, 110, 111, 112
 See application file for complete search history.

(56) References Cited

U.S. PATENT DOCUMENTS

| | | | | |
|---|---|---|---|---|
| 3,711,038 A * | 1/1973 | Van Otteren | | 406/19 |
| 4,180,354 A * | 12/1979 | Greene | | 406/112 |
| 4,512,688 A * | 4/1985 | Hochradel | | 406/111 |
| 4,984,939 A * | 1/1991 | Foreman et al. | | 406/84 |
| 5,584,613 A * | 12/1996 | Greene et al. | | 406/19 |
| 6,039,510 A * | 3/2000 | Greene et al. | | 406/21 |
| 6,652,198 B2 * | 11/2003 | Nickoson | | 406/13 |
| 7,153,065 B2 * | 12/2006 | Lowell | | 406/110 |
| 7,326,005 B1 * | 2/2008 | Castro et al. | | 406/192 |
| 7,950,879 B2 * | 5/2011 | Hoganson et al. | | 406/12 |

* cited by examiner

*Primary Examiner* — Gene Crawford
*Assistant Examiner* — William R Harp
(74) *Attorney, Agent, or Firm* — Chamberlain Hrdlicka

(57) ABSTRACT

A pneumatic transport system is used to transport an object through a conduit extending between a first location to a second location by generating a pressure differential in the conduit. Based on detection of the movement of the object through the conduit, the pressure differential in the conduit is reduced in a controlled manner to slow the movement of the object and safely land it at the second location.

21 Claims, 3 Drawing Sheets

PNEUMATIC DELIVERY SYSTEM WITH BRAKING

BACKGROUND

Pneumatic transport systems are used in many applications to convey items to various locations. Typically, in such systems, the items are placed in a carrier which is pneumatically conveyed at high speeds through a tube to a desired destination. Depending on the application in which the system is employed, the conveyed items may range from lightweight paper items (e.g., money, documents) to heavier goods or components used in a manufacturing facility or sold in a retail store. In many instances, the conveyed items may be fragile, and thus care must be taken so that excessive forces are not imparted to the items during their high-speed transport and delivery to their destination.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

A pneumatic transport system is described that is arranged to transport an object, such as a carrier, through a conduit (e.g., a pneumatic transfer tube) that extends between two or more locations or terminals. As examples, the transport system may be used to convey money or documents placed in a drive-up banking system, components between assembly stations in a manufacturing system, or any type of system in which it is desired to rapidly convey items from one location to another.

In such systems, the force that moves the object between locations is developed by creating a pressure differential across the object within the conduit. The differential pressure may be created by a variety of pressure systems that may include blowers, motors, vacuum pumps, or other devices as may be appropriate to create the desired differential pressure that results in a pneumatic force sufficient to propel the object to a desired location. Generally, the item to be transported is placed in a carrier that is accessible to a user at a first terminal. A pneumatic force is then generated that moves the carrier through the conduit from the first terminal to a second terminal where the items are then removed from the carrier by a user. The user at the second terminal also may place items in the carrier which then may be transported by pneumatic forces back to the first terminal (or to other terminals within the transport system).

As the weight of the items placed in the carrier may vary considerably, the transport system typically is designed to generate a pneumatic force that is capable of moving the carrier through the conduit in the worst case situation. As a result, the blowers and/or vacuum pumps in the system may be over-designed, which may unnecessarily increase the costs of the system. In addition, because the system is designed for the worst case scenario, the pneumatic force that is generated may be excessive for lightweight items such that the carrier arrives at its destination with a substantial impacting force that could damage the items in the carrier.

Figure 1:
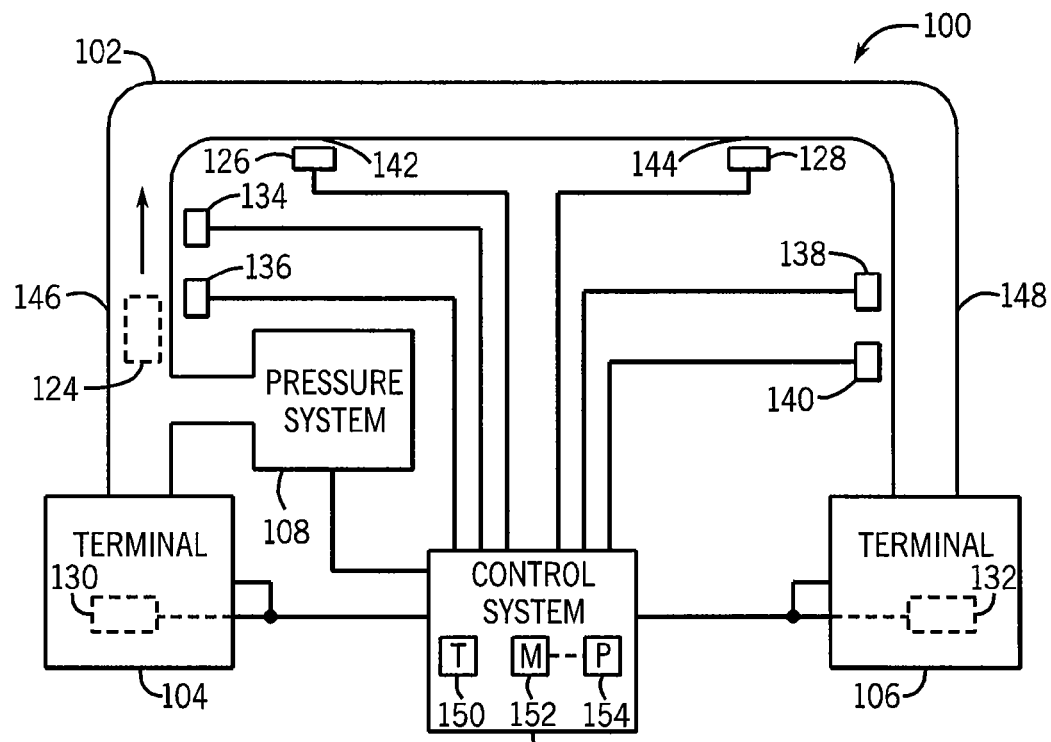
FIG. 1 is a block diagram of an exemplary pneumatic transport system in accordance with an embodiment of the invention.
Figure 2:
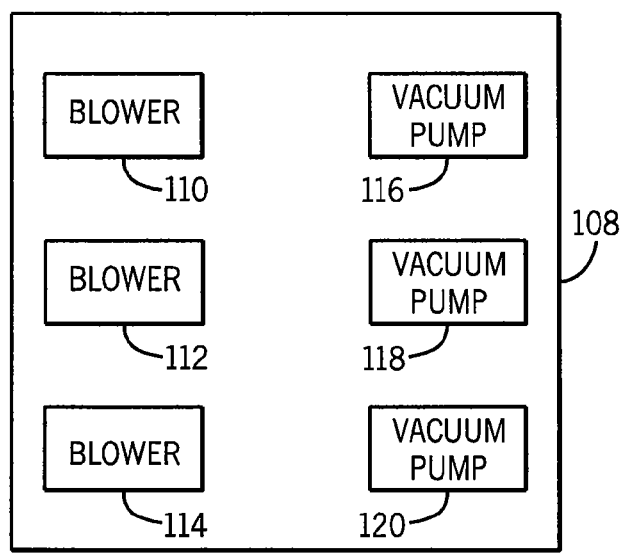
FIG. 2 is a block diagram of an exemplary differential pressure system that may be implemented in the system of FIG. 1, in accordance with an embodiment of the invention.

An exemplary embodiment of a pneumatic transport system 100 that addresses these issues is illustrated in the block diagram of FIG. 1. As shown in FIG. 1, the system 100 includes a conduit or tube 102 that extends between a first terminal 104 at a first location and a second terminal 106 at a second location. The system 100 further includes a pressure differential system 108, which in the embodiment of FIG. 1, is located proximate the first terminal 104. The pressure differential system 108 includes a plurality of devices for creating a pneumatic force. For instance, as shown in FIG. 2, the system 108 may include a plurality of blowers 110, 112, 114 and a plurality of vacuum pumps 116, 118, 120. Although three blowers and three vacuum pumps are shown in FIG. 2, the pressure differential system 108 may include fewer or more blowers and vacuum pumps and may include more blowers than vacuum pumps or more vacuum pumps than blowers. In addition, it is contemplated that system 108 may include other types of devices that are suitable for creating a pressure differential across a carrier 124 within the conduit 102.

Figure 4:
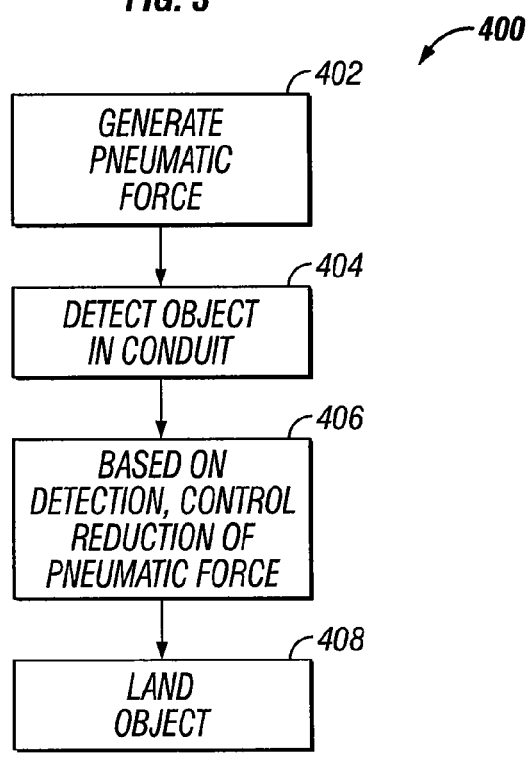
FIG. 4 is a flow diagram of an exemplary control technique to control a pressure differential that may be implemented in the systems of FIGS. 1 and 3.

Referring to FIG. 1 and the flow diagram 400 of FIG. 4, the generation of differential pressure is controlled by a control system 122 that is in communication with the pressure system 108. When a user desires to send the carrier 124 from the terminal 104 to the terminal 106, the control system 122 issues a command that causes the pressure system 108 to generate a pneumatic force (step 402). In this example, the pneumatic force is generated by activation of the blowers 110-114 in the pressure system 108. In a similar manner, when the carrier 124 is sent from the terminal 106 to the terminal 104, the pneumatic force is generated by activation of the vacuum pumps 116-120. In any event, the control system 122 is configured to then adapt the amount of the pneumatic force based on the detection of the object 124 (step 404) as it moves through the conduit 102 towards the second terminal 106. As a result, the rate at which the object 124 moves through the conduit 102 and its impact upon arrival at the second terminal 106 may be controlled in a manner that provides for sufficient force to move and rapidly transport the object 124 but does not result in damage to the items transported by the carrier 124 when it is stopped at the second terminal 106. As shown in FIG. 4, based on the detection of the object 124, the pneumatic force is reduced in a controlled manner (step 406) and the object 124 safely lands at the terminal 106 (step 408).

Figure 3:
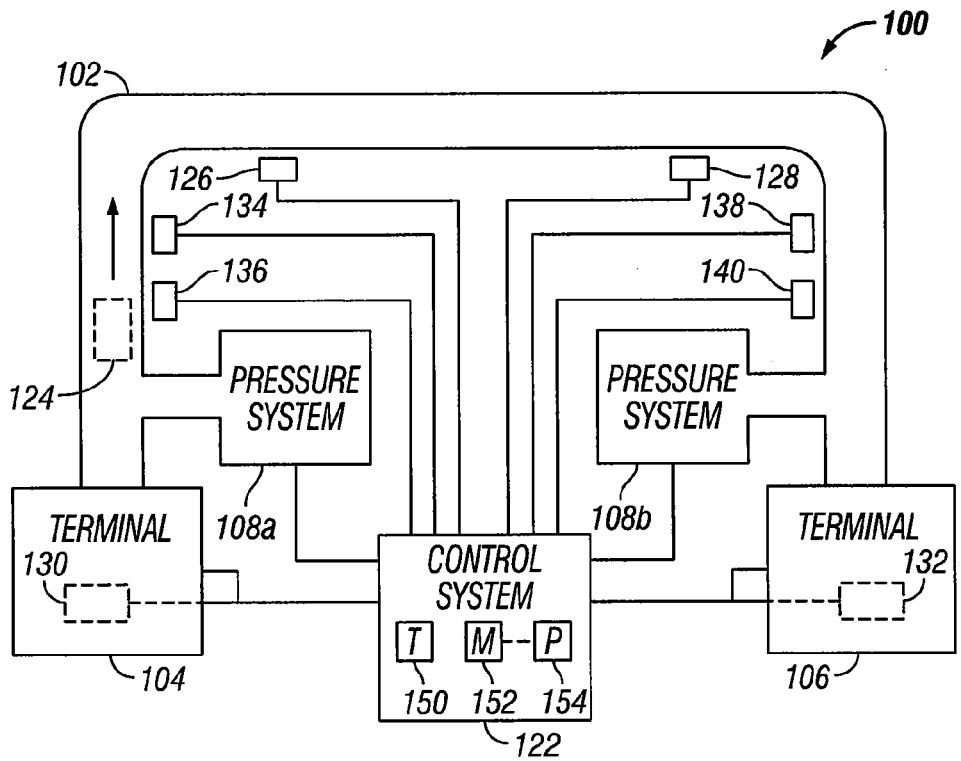
FIG. 3 is a block diagram of another exemplary pneumatic transport system in accordance with an embodiment of the invention.

In other embodiments, the pressure differential system 108 may be a distributed system. For instance, as shown in FIG. 3, system 108 may include a first portion 108a that is located proximate the first terminal 104 and a second portion 108b that is located proximate the second terminal 106. The two portions 108a and 108b each may include a plurality of devices (e.g., blowers and vacuum pumps) for creating the desired differential pressure. Distribution of the pressure differential system 108 in this manner may provide for finer control of the reduction of the pressure differential when slowing the movement of the carrier 124 through the conduit 102.

In the embodiments shown in FIGS. 1 and 3, control of the movement of the object 124 through the conduit 102 is facilitated through the use of one or more sensors 126-140 that are in communication with the control system 122. In one embodiment, sensors 126 and 128 are placed at selected locations 142, and 144, respectively, along the conduit 102, such as at a predetermined distance removed from the first terminal 104 and the second terminal 106, to detect the movement of the carrier 124. In the embodiment shown, the sensors 126 and 128 may be placed at a predetermined distance (e.g., 3 feet) before the vertical drop portions 146, 148 of the conduit 102. The sensors 126, 128 may be any type of sensing device suitable for detecting the object 124 as it moves through the conduit 102, such a mechanical switches, optical sensors, etc.

In a system 100 configured with sensors 126 and 128, when the carrier 124 is conveyed from the first terminal 104 to the second terminal 106, detection of the carrier by the sensor 128 is communicated to the control system 122. In response, the control system 122 communicates one or more control signals to the pressure differential system 108 to cause the system 108 to initiate reduction of the pressure differential in the conduit 102, thus reducing the rate of movement of the carrier 124 to a desired level prior to its arrival at the second terminal 106 and/or to ultimately land the carrier 124 at the second terminal 106 with a minimal impact that will not damage the contents of the carrier. Likewise, when the carrier 124 is conveyed from the second terminal 106 to the first terminal 104, detection of the carrier 124 by the sensor 126 is conveyed to the control system 122. Based on detection of the carrier 124 at this location 142, the control system 122 communicates one or more control signals to the pressure differential system 108 to again reduce the pressure differential in the conduit 102 to slow the rate of movement of the carrier 124 before it arrives at the first terminal 104 and/or safely land the carrier 124 at the first terminal 104.

Figure 5:
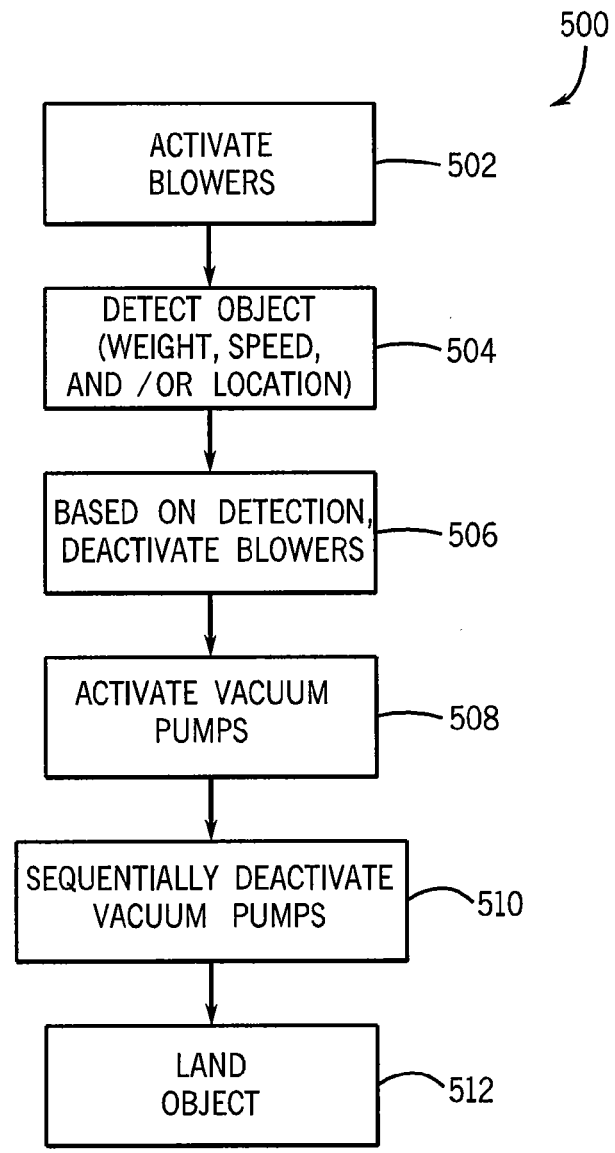
FIG. 5 is a flow diagram of further exemplary control techniques to control a pressure differential in accordance with an embodiment of the invention.

In embodiments of the invention in which the differential pressure system 108 includes a plurality of devices 110-120 (e.g., FIG. 2), and as shown in the flow diagram 500 of FIG. 5, reduction of the pressure differential is controlled in an incremental manner so as to gradually reduce the speed of the carrier 124 and control its landing at the terminal 106 or 104. For instance, to propel the carrier 124 from the first terminal 104 to the second terminal 106, the blowers 110-114 in the system 108 are activated (block 502). Upon detection of the carrier 124 by the sensor 128 (block 504), the control system 122 causes the pressure differential system 108 to deactivate or reverse the blowers 110-114 (block 506). As represented by block 510 in the flow diagram 500, after a first time delay (e.g., approximately 0.5 seconds), the vacuum pumps 116-120 in the system 108 are activated, thus further slowing the movement of the carrier 124 (block 508). After a second time delay (e.g., approximately 0.75 milliseconds), the vacuum pumps 116 is shut down and vacuum pumps 118 and 120 continue to run. After a third time delay (e.g., 0.5 seconds), the second vacuum pump 118 is shut down. Finally, after a fourth time delay (e.g., 0.5 seconds), the third vacuum pump 120 is shut down and the carrier lands safely at the terminal 106 (step 512). It should be understood that the length of the time delays depend upon the particular application in which the transport system 100 is implemented and may be based on various factors, such as the length of the conduit 102, the length of the vertical drop portions 146, 148 the size of the carrier 124, the fragility of the items conveyed in the carrier 124, etc. In other embodiments, some of the above steps may be omitted and other steps may be added to reduce the differential pressure in a controlled manner. For instance, at step 506, the blowers 110-114 may be deactivated sequentially prior to activating the vacuum pumps 116-120.

It should be understood that, in the example above, when the carrier 124 is transported from the terminal 106 to the terminal 104, the vacuum pumps 116-120 are activated to generate the pneumatic force to move the carrier 124. Then, to reduce the pneumatic force, the vacuum pumps 116-120 are deactivated and the blowers 110-114 are activated and then sequentially shut down.

In some embodiments, the weight of the items conveyed by the carrier 124 also may be taken into consideration when controlling the reduction in the pressure differential. Towards that end, the system 100 may include sensors 130 and 132 located at each of the first and second terminals 104, 106 to provide an indication of the combined weight of the carrier 124 and the items conveyed therein. The sensors 130, 132 may communicate an indication of this weight to the control system 122. This indication of weight may also be used by the control system 122 to determine the number of devices (either blowers or vacuum pumps) in the pressure differential system 108 to activate when initially propelling the carrier from the terminal 104. In this manner, wear and tear on the pressure differential system 108 may be reduced since, depending on the weight of the carried items, all of the devices 110-114 or 116-120 may not need to be activated every time that the carrier 124 is launched.

In other embodiments, control of the reduction of the pressure differential may be accomplished by deducing the weight of the carrier 124 and carried items by detecting the speed at which the carrier 124 is moving through the conduit 102. For instance, as shown in FIGS. 1 and 3, the system 100 may include sensors 134, 136 and 138, 140 positioned at spaced-apart locations along the conduit 102 to provide an indication of the speed of the carrier 124. These indications are communicated to the control system 122, which, based on these indications, appropriately controls the reduction of the pressure differential within the conduit 102 so as to slow the rate of movement of the carrier 124 and/or ultimately land the carrier at the receiving terminal such that the carried items will not be damaged. Again, sensors 134, 136 and 138, 140 may be any type of sensing device capable of detecting the carrier 124 as it moves past the sensed locations, such as mechanical switches, optical sensors, etc., or may be sensors that are adapted to directly monitor speed.

In other embodiments of the invention, control of the reduction of the pressure differential may be on a timer. For instance, the control system 122 may include a timer 150 that is started upon launch of the carrier 124 from the first terminal 104. After elapse of a predetermined time period (depending on the length of the conduit and the amount of pneumatic force), the control system 122 may communicate one or more control signals to the pressure differential system 108 to reduce the pressure differential in the conduit to slow the rate of movement of the carrier 124 and/or to provide for a landing with minimal impact so as not to damage items contained in the carrier.

In still other embodiments, control of the reduction of the pressure differential may be performed based on a combination of time and location. For instance, the rate at which the pressure differential is reduced may be based on how quickly the carrier 124 arrives at the sensed location 144 after being launched from the terminal 104.

It should be understood that the system 100 may included all of the sensors 126-132 or only a subset of the sensors 126-132. Alternatively, depending on the particular application in which the system 100 is employed, the system 100 may base control of the pressure differential only on the timer 150 or only on the weight of the carrier 124 and its contents.

The control system 122 may be a programmable logic controller or other type of control system, such as a system that includes a memory 152 for storing software code that implements the techniques of FIGS. 4 and 5 for controlling the pressure differential in the conduit 102, as well as a processor 154 or other controller to execute that code.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method to transport an object within a conduit extending between a first location and a second location, comprising:
    generating a pneumatic force within the conduit by operating multiple pneumatic force devices at a location proximate the first or second location to move the object from the first location towards the second location;
    detecting movement of the object within the conduit; and
    based on the detected movement, controlling the pneumatic force from the same location by reversing the direction of the generated pneumatic force and altering the operation of the pneumatic force devices at the location in time-delayed increments to reduce the reversed pneumatic force over time and control movement of the object to a desired rate prior to arrival at the second location.

2. The method as recited in claim 1, wherein generating the pneumatic force comprises activating a plurality of air blowers.

3. The method as recited in claim 2, wherein controlling the pneumatic force comprises deactivating a first air blower of the plurality of air blowers.

4. The method as recited in claim 2, wherein controlling the pneumatic force comprises activating a plurality of vacuum generators.

5. The method as recited in claim 1, wherein controlling the pneumatic force is initiated upon detection of the object at a predetermined location within the conduit, wherein the predetermined location is between the first and second locations.

6. The method as recited in claim 1, wherein the detected movement provides an indication of speed of the object, and wherein controlling the pneumatic force is based on the detected speed.

7. The method as recited in claim 1, wherein controlling the pneumatic force is further based on a weight of the object.

8. A method of moving an object through a conduit extending between a first location and a second location, comprising:
    generating a pneumatic pressure differential across the object within the conduit by operating multiple pneumatic force devices at a location proximate the first or second location to move the object from the first location to the second location; and
    while the object is moving within the conduit, controlling the pneumatic pressure differential from the same location by reversing the direction of the generated pneumatic pressure differential and altering the operation of the pneumatic force devices at the location in time-delayed increments to reduce the reversed pressure differential across the object over time based on a weight of the object to stop the movement of the object at the second location.

9. The method as recited in claim 8, wherein generating the pneumatic pressure differential comprises increasing the pressure at the first location relative to the second location.

10. The method as recited in claim 8, wherein generating the pneumatic pressure differential comprises reducing the pressure at the first location relative to the second location.

11. The method as recited in claim 8, further comprising:
    detecting movement of the object within the conduit; and
    determining the weight of the object based on the detected movement.

12. The method as recited in claim 8, further comprising:
    detecting the object within the conduit; and
    reducing the reversed pressure differential across the object over time controls movement of the object to a desired rate.

13. The method as recited in claim 12, wherein the revers pressure differential is reduced incrementally.

14. The method as recited in claim 13, wherein generating the pressure differential comprises activating a plurality of air blowers located proximate the first location; and wherein altering the operation in increments comprises sequentially deactivating the air blowers.

15. The method as recited in claim 13, wherein generating the pressure differential comprises activating a plurality of pneumatic force devices proximate the first location; and wherein altering the operation in increments comprises sequentially deactivating the pneumatic force devices to stop the object at the second location.

16. A pneumatic transport system for transporting an object, comprising:
    a pressure differential system configured to generate a pressure differential across the object within a conduit extending between a first location and a second location with the operation of multiple pneumatic force devices proximate the first or second location;
    sensors to detect movement of an object through the conduit between the first location and the second location; and
    a control system in communication with the pressure differential system and the sensors to control the pressure differential within the conduit based on the detected movement of object, wherein the control system is configured to reverse the direction of the generated pressure differential and alter the operation of the multiple pneumatic force devices in time-delayed increments to reduce the reversed pressure differential across the object over time to slow movement of the object to a desired rate prior to arrival at the second location.

17. The system as recited in claim 16, wherein the pressure differential system comprises a plurality of air blowers and a plurality of vacuum generators.

18. The system as recited in claim 17, wherein the pressure differential system is located proximate the first location.

19. The system as recited in claim 17, wherein the pressure differential system is a distributed system, wherein a first portion of the distributed system is located proximate the first location and a second portion of the distributed system is located proximate the second location.

20. The system as recited in claim 17, wherein the control system is capable of incrementally reducing the reversed pressure differential within the conduit based on the detected movement of the object.

21. The system as recited in claim 20, wherein the control system is capable of incrementally reducing the reversed pressure differential within the conduit further based on a weight of the object.

* * * * *